Dec. 13, 1932.  V. MORRISON  1,890,792
WELDING MACHINE
Filed Sept. 12, 1929 4 Sheets-Sheet 2
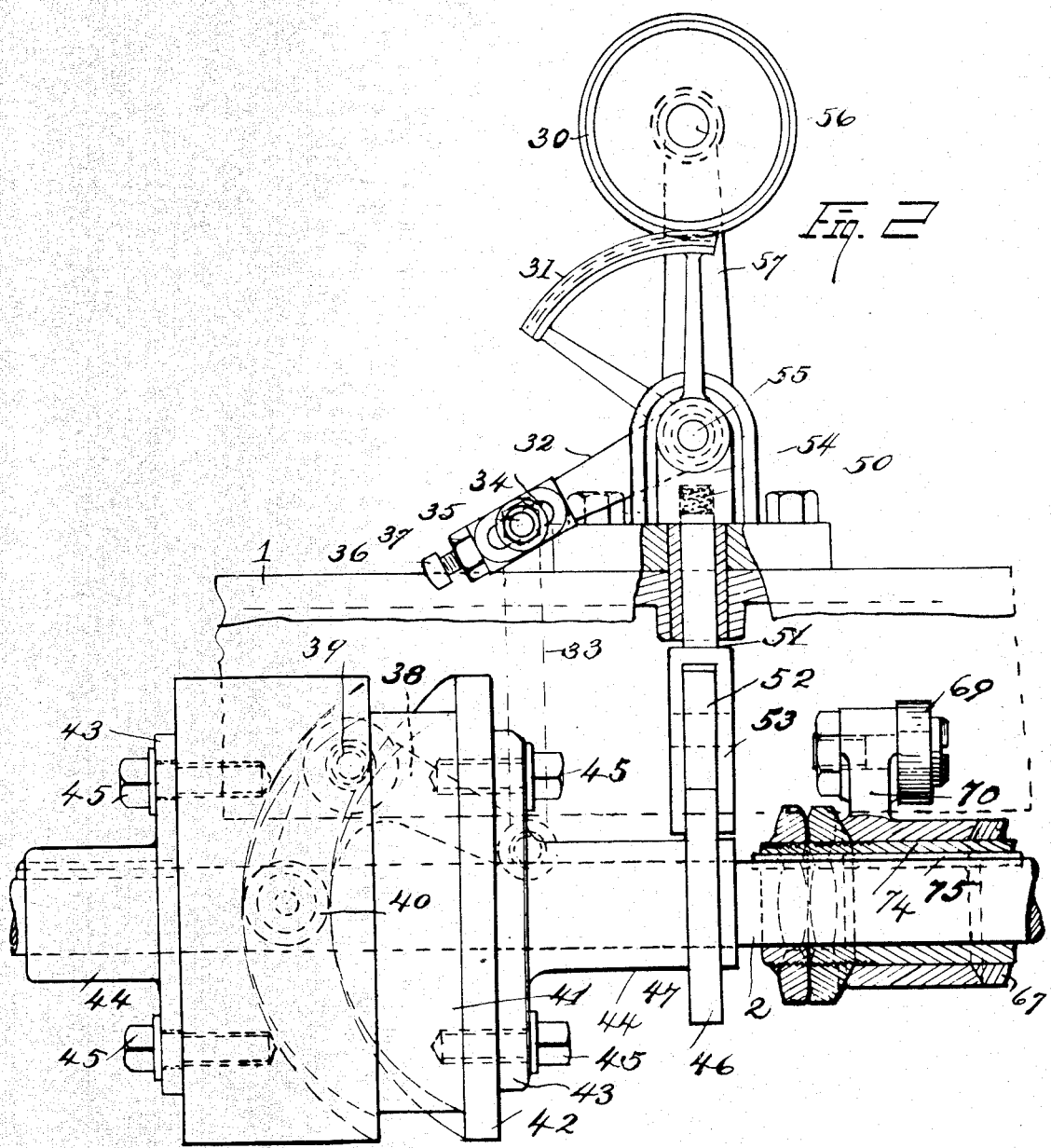
INVENTOR.
Vandolah Morrison
BY
ATTORNEY.

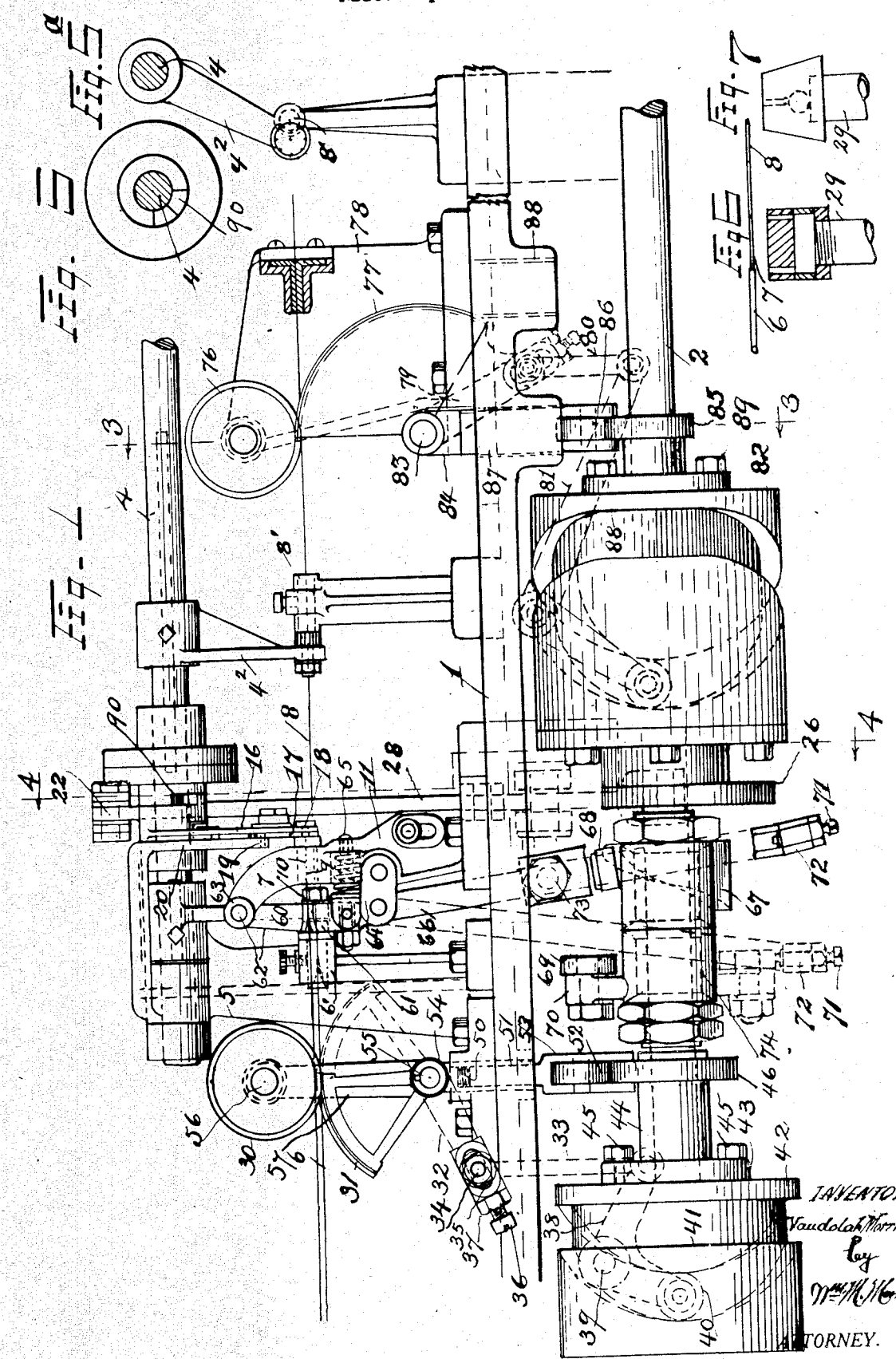

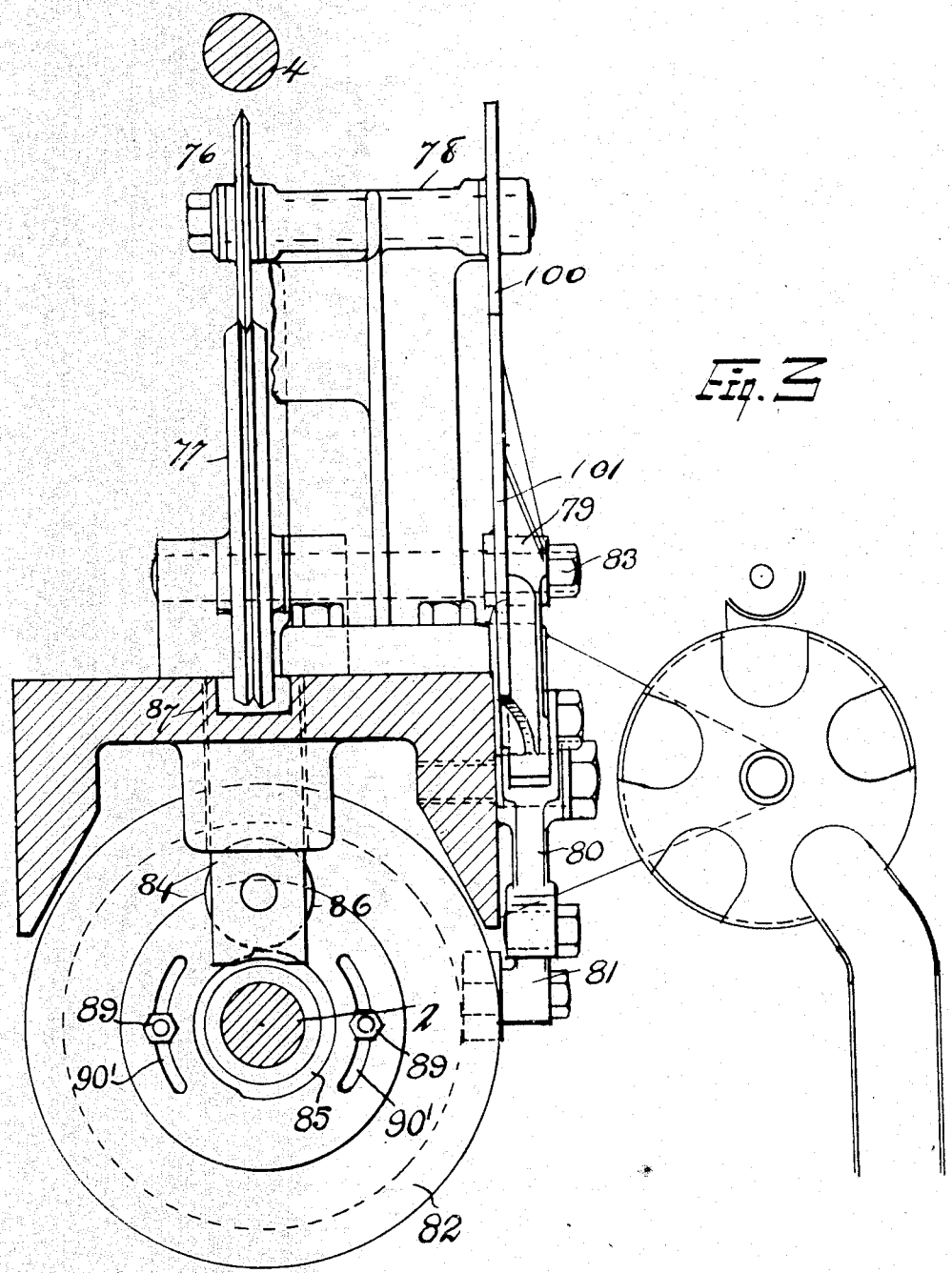

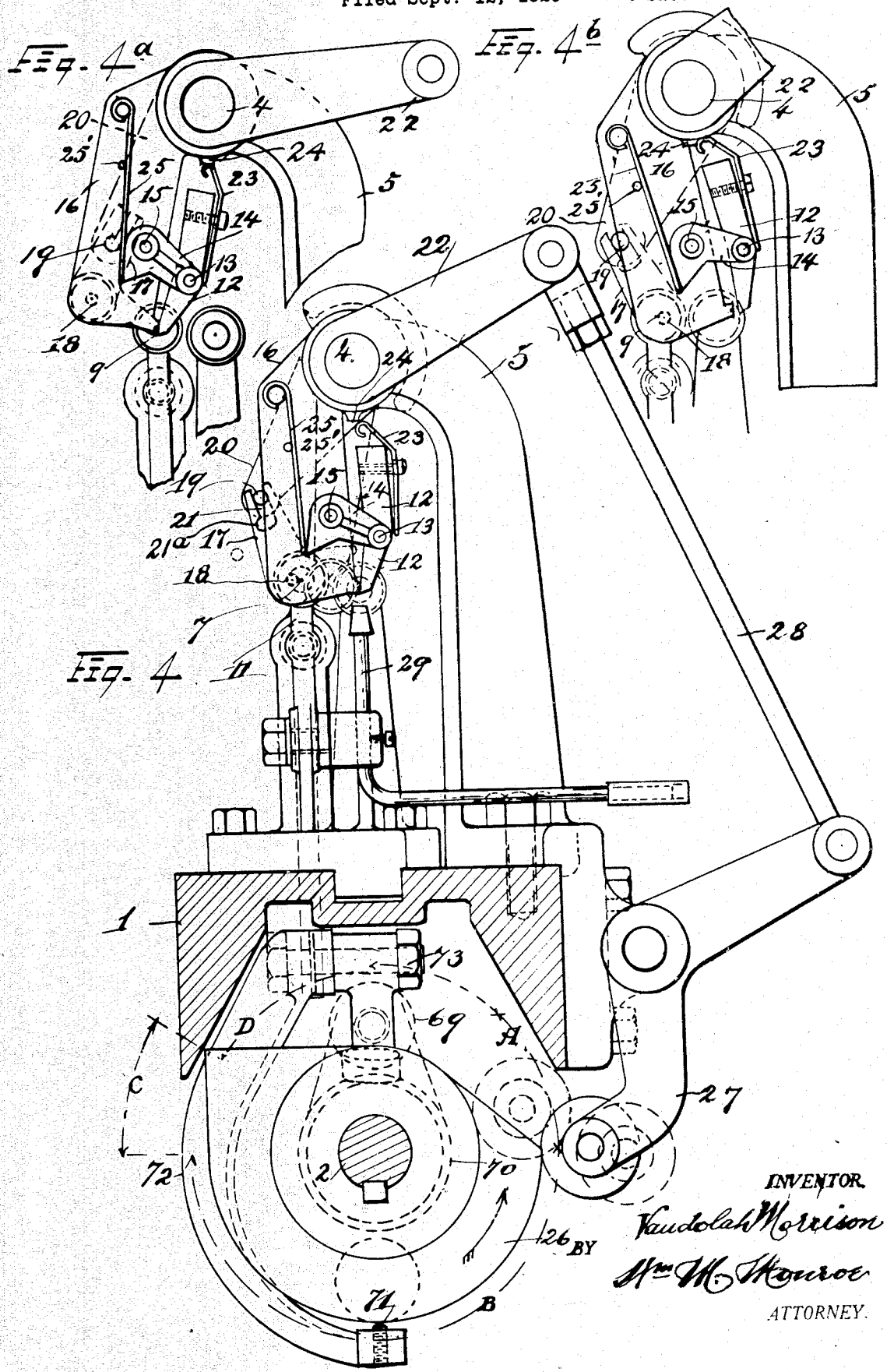

Patented Dec. 13, 1932

1,890,792

UNITED STATES PATENT OFFICE

VANDOLAH MORRISON, OF CLEVELAND, OHIO, ASSIGNOR TO EDITH J. CONWAY, OF CLEVELAND, OHIO

WELDING MACHINE

Application filed September 12, 1929. Serial No. 392,070.

The objects of the invention are to provide an automatically acting machine for welding together the sections of the lead-in wires of incandescent lamps. These sections are now constructed of dissimilar metals, the section which passes through the glass stem of the bulb being composed of a metal having substantially the same coefficient of expansion as that of the glass of which the stem is composed. These sections may be composed of nickel, copper coated iron, copper, or other metals, as the circumstances may require, and may vary in thickness and length for application to different lamps, to a considerable degree, hence, wire feeding, clamping and shearing mechanisms are provided that are capable of adjustment in themselves, and also are adjustable for timing relative to each other, so that the several wire stocks may be fed into the machine, sheared to their several required lengths, and the sections assembled simultaneously into abutted and alined positions preparatory to welding the same.

The invention is exemplified in a machine for welding three wire sections together, but is applicable for use in welding lead-in wires that may be composed of a greater or lesser number of sections.

To accomplish these and other valuable results the invention consists in the adjustable means for assembling and severing the wires in abutted positions and for welding the several sections hereinafter described, illustrated in the accompanying drawings and particularly pointed out in the claims.

In the drawings Fig. 1 is a side elevation showing the working parts assembled; Fig. 2 is a side elevation of an assembled group comprising the cam that operates the gripping rolls for the nickel wire, and the cam that advances the nickel wire, a portion of the figure showing the means for operating and adjusting the releasing rollers for the short wire, and shown in section; Fig. 3 is a transverse section of the clamping roller and cam and the advancing cam for the copper wire, also showing in side elevation a portion of the carton loading mechanism, which will be made the subject of a separate application. This section is taken on the line 3—3 of Fig. 1; Fig. 4 is a transverse section on line 4—4 of Fig. 1, showing the cam that operates the three shears for cutting nickel, iron and copper wires to the required lengths. It also shows the shearing and clamping mechanism for the iron wire in the welding position; Fig. 4a shows the shearing mechanism in operating position; Fig. 4b shows the transferring and clamping mechanism in the open position; Fig. 5 is an end elevation of a clutch which is employed to sever the copper wire independently of the other operations; Fig. 5a is an end elevation of one of the shearing arms for the wires; Fig. 6 is a vertical section of the burner nozzle 29, and Fig. 7 is a side elevation thereof.

In these views, 1 is a bed plate upon which all the mechanism is mounted; 2 is a drive shaft below the bed plate; 4 is a rocker shaft above the bed plate; 5, 5 are standards for the rocker shaft; 6 is the nickel wire; 7 is the iron wire; and 8 is the copper wire. The iron wire is coated with copper to provide good conductivity, the iron body enabling it to be welded to the nickel and also enabling it to expand in the same ratio with the glass.

The three wires must be alined in the welding position before welding. The nickel and copper wires 6 and 8 are first fed to longitudinally spaced positions through guides 6' and 8'. The iron wire 7 is cut to length, and is afterwards transferred into alinement with the nickel and copper wires 6 and 8, respectively, within the gap between their inner ends. This operation is illustrated in Figs. 4, 4a, and 4b. Here the iron wire 7 is fed through a fine opening 9 in a guide 10 mounted upon a standard 11.

16 is a clamping arm mounted upon the shaft 4 and operated by means of an arm 22, link 28, rock arm 27, and cam 26, the latter being on the main shaft 2. 12 is the other portion of the clamp which is pivoted at 13 to one end of a link 14, the other end of which is pivoted at 15 to the clamping arm 16 and movable therewith.

The clamping member 12 is pressed against the arm 16 as the latter revolves, and holds the iron wire until it is cut off by means of a swinging shear 17 which is pivoted at 18 to the arm 16, and as the latter swings inwardly the shear is revolved by means of a pin 19 on a stationary arm 20, and a slot 21 in the other extremity of the revolving shear. An arc 21a in the slot 21 permits a further releasing movement of the arm 16 without operating the shear member.

As soon as the arm 16 moves to operate the shear 17, the pivoted clamping member 12 is held closely in engagement with the wire by means of an adjustable spring 23, and a lug or cam 24 on the standard 11. The clamping members are thus held together until the spring passes by the lug, at which time a second spring 25 is operated by a pin 25' to press against the outer end of the link 14 to release the clamp member 12 from the pressure of the spring 23 to release the severed wire.

A cam 26 upon the main shaft operates the several parts of the clamp and shear mechanisms through the action of the rock arm 27, link 28, and rock arm 22, in the following manner.

In Fig. 4, the cam in its rotation through arc A has just completed its action to clamp, shear and transfer the iron wire to the welding position. The arc B shows the movement of the cam while the rest is taking place. Rotation through arc C serves to cut off the welded wires. Further rotation through arc D causes the return of the parts to the normal position. In Fig. 4a the parts are shown before the shearing action takes place, after which the severed wire is transferred by the clamping members and held in the welding position shown in Fig. 4 long enough to complete the weld.

The iron wire is fed into position by means of segmental rolls 60 and 61. The upper segmental roll 60 is pivoted at 62 to the upper end of a standard 63, and the lower segmental roll 61 is pivoted to a link 64 which in turn is pivoted to the standard 63. The lower segmental roll is capable also of vertical movement which is imparted to it by the action of a spring 65 as the arm 66 vibrates. This action in combination with the movement of the vibrating arm 66 causes the segment to alternately grip and release the iron wire. The arm 66 is caused to vibrate by means of a spiral cam 67 which engages with a roller 68 on the arm 66. The release of the segment 61 is accomplished by the contact of a roller 69 on an arm 70, with an adjusting screw 71 on a curved arm 72 which is attached at 73 to the vibrating arm 66. (See Fig. 4.)

The arm 70 and cam sleeve 67 are mounted on a bushing 74 which is keyed at 75 to the drive shaft 2, by means of a feather key, see Fig. 2, and can be longitudinally adjusted and rotated to accurately time the relative movements of the gripping and releasing cams, and also relatively to other cams, thus providing for extremely fine adjustment of all movements relative to each other.

The feeding mechanism for the copper wire 8 consists of upper and lower rolls 76 and 77, respectively, which feed the wire into a guide 8'. The upper roll is mounted on a standard 78, and the lower roll comprises a segment having an arm 79 which is vibrated to feed the wire by means of a link 80, bell crank 81, and cam 82, the latter being on the shaft 2.

The segmental roll 77 is pivoted at 83 upon the head of a plunger 84 which is raised and lowered to alternately engage and disengage with the wire by means of a cam 85 on the shaft 2, which contacts with a roller 86 on the plunger 84 moving in a vertical guide 87 in the bed plate. Another guide or guides 88 may be employed for longer wires, and the cam can be slipped along the shaft for this use. The cam 85 is driven by a flange 88' which is secured for rotatable timing adjustment on the cam 82, by means of bolts 89 and arcuate slots 90' in the flange. See Fig. 3. The cams 26, 82 and 85 are adjustably attached together and driven by the shaft 2, and hence can be relatively timed without difficulty.

The nickel wire 6 is fed through a guide 6' on the machine bed by means of feed rolls 30 and 31. The driving roll 31 is shown as a segment, and the driven roll 30 as a complete circle. The feed roll 31 is actuated by means of a rock arm 32, link 33, and a bell crank 38 which is pivoted at 39 upon the bed plate 1. The rock arm 32 and link 33 are connected by means of a pin 34 and slot 35, the pin being adjustable in the slot by means of a screw 36 and lock nut 37. A roller 40 on the bell crank is engaged with a groove 41 in a cam 42 on the main shaft 2, which gives the necessary vibratory movement. The cam 42 is secured to and driven by flanges 43 having sleeves 44 keyed to the shaft 2. Provision for timing the cam is made by slotting the flanges and passing bolts 45 therethrough.

The segmental feed roll 31 is raised to engage with the nickel wire by means of a cam 46 mounted on one of the flanged sleeves 44. The vertical movement of the segmental roll 31 is slight. A spring 50 rests upon the upper end of a plunger 51 for the purpose of accommodating various gauges of wire. A roller 52 mounted in a fork 53 on said plunger engages with the cam 46, and the plunger bears at its upper end a head 54, in which the segmental roll 31 is pivoted at 55. The upper roll 30 is pivoted at 56 on a standard 57.

The members 42, 82, 67, 70, and 26 are slidable and rotatable on the main shaft 2 for mutual adjustment according to the length of the wire sections required. Bearing rolls 100 and 101, shown in Fig. 3, are employed to support the upward thrust of the outer ends of all the roll shafts.

The actual operation of the machine may be described as follows:

The wires 6, 7 and 8 are fed through the several guides by the feed rolls until the desired length is automatically obtained. The long outer wires remain stationary, leaving a gap of the length of the intermediate wire between them. The short wire is then severed by means of the rock arm 16 and shear member 17, and is then transferred to the welding position in alinement with the outer wires and closely arranged thereto.

After welding, the arm 28 and cam 26 operate the clutch 90 and arm 4² thereon and operate the shearing members to sever the long wires 6 and 8. The welded wire may then drop out of the machine and the wires may be collected and counted by means of additional mechanism if desired.

Having described the invention what I claim as new and desire to secure by Letters Patent is:

1. In a machine of the character described, spaced adjustable mechanism for gripping and feeding the end sections of a composite lamp wire into alinement with each other in longitudinally spaced positions in said machine, adjustable means for automatically shearing said sections to their desired lengths, and means for releasing said gripping means, automatically acting and adjustable means for feeding the intermediate section into said machine, and means for transferring the same into the gap between said end sections and into an alinement therewith, a common operating shaft and an adjustable cam thereon for each of said operating means, said operating means being adjustable relatively to each other.

2. In an automatically acting machine for welding the end and intermediate sections of a sectional lamp wire, in combination, a common actuating shaft, upper and lower feed rolls for each of said end wires, cams on said shaft for giving a vibratory motion to each lower feed roll, cams on said shaft for alternately therewith lowering the lower feed rolls to release said end sections, and shearing arms on said shaft acting conjointly with shearing faces on said standards to shear said end sections, a sleeve on said rock shaft and a cam on said main shaft for operating said sleeves and circumferentially spaced clutch members on said sleeve and shaft.

3. In an automatically acting machine for welding the end and intermediate sections of a sectional lamp wire, in combination, a common actuating shaft, upper and lower feed rolls for each of said end wires, cams on said shaft for giving a vibratory motion to each lower feed roll, cams on said shaft for alternately therewith lowering the lower feed rolls to release said end sections, an elevated rock shaft, standard guides for said sections, and shearing arms on said shaft acting conjointly with shearing faces on said standards to shear said end sections, a sleeve on said rock shaft and a cam on said main shaft for operating said sleeve, and circumferentially spaced clutch members on said sleeve and shaft and means for actuating said rock shaft.

4. In a machine for welding the outer intermediate and inner sections of a sectional lamp wire, in combination, means for positioning said outer and inner wires in spaced axial relation to each other, means for feeding said intermediate wire into a position opposite the gap in the other wires comprising, a standard having a stationary arm, a clamp arm pivoted upon said standard and means for operating the same, an opposed clamp member, a link pivoted upon said clamp arm, upon the outer end of which said opposed clamp member is pivoted, said link and opposed clamp member being movable with said clamp arm, means on said stationary arm for operating said shear, a spring operating to hold the clamping members together at the welding position, means for operating and releasing said spring and a second spring engaging said link for opening said clamps to release said intermediate wire.

5. In a welding machine for a sectional lamp wire, means for severing the intermediate wire and for transferring the same to the welding position comprising, the combination with a wire feeding means, of a standard, a stationary arm thereon, a clamp arm pivoted on said stationary arm at its outer end, an opposed clamp member, a link pivoted at one end on said clamp arm, upon the other end of which said opposed clamp member is pivoted, a rocking shear member pivoted upon the pivotal point of said pivoted clamp arm, and having a slotted arm engaged with a pin in said stationary arm, a closing spring for said opposed clamping member and a releasing spring therefor secured to said pivoted clamp arm and a lug on said standard normally engaged with said closing spring to close said opposed clamping member upon said pivoted clamping arm, said lug being constructed and arranged to permit the release of said closing spring when the welding position has been passed, and the release of said intermediate wire.

6. In a welding machine for a sectional lamp wire, means for severing the intermediate wire and for transferring the same to the welding position, comprising the combination with a wire feeding means, of a standard, a stationary arm thereon, a clamp arm pivoted on said stationary arm at its outer end, an opposed clamp member, a link pivoted at one end on said clamp arm, upon the other end of which said opposed clamp member is pivoted, a rocking shear member pivoted upon the pivotal point of said pivoted clamp arm and having a slotted arm engaged with a pin in said stationary arm, a closing spring for said opposed clamping member and a releasing spring therefor secured to said pivoted clamp arm, a lug on said standard normally engaged with said closing spring to close said opposed clamping member upon said pivoted clamping arm, said lug being constructed and arranged to permit the release of said closing spring when the welding position has been passed and the release of said intermediate wire, a main operating shaft, a cam thereon, a rock arm and link operatively connecting the movements of said cam with said pivoted clamping arm.

7. In a device of the character described, the combination with wire feeding, shearing, and clamping mechanisms, of a main shaft, operating cams for said mechanism; a bushing secured on said shaft, sleeves on said bushing bearing the respective cams aforesaid, adjusting nuts therefor on said bushing, and means for operatively connecting said cams with their respective mechanism.

In testimony whereof I hereunto affix my signature.

VANDOLAH MORRISON.